United States Patent
Shimizu et al.

(10) Patent No.: US 9,988,815 B1
(45) Date of Patent: *Jun. 5, 2018

(54) CEILING PANEL ASSEMBLY AND MOUNTING SYSTEM THEREFOR

(71) Applicant: C&D ZODIAC, INC., Huntington Beach, CA (US)

(72) Inventors: Bruce Shimizu, Costa Mesa, CA (US); Scott Savian, Huntington Beach, CA (US)

(73) Assignee: C&D ZODIAC, INC., Huntington Beach, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/875,980

(22) Filed: Jan. 19, 2018

Related U.S. Application Data (63) Continuation of application No. 15/011,215, filed on Jan. 29, 2016, now Pat. No. 9,874,012.

(60) Provisional application No. 62/110,380, filed on Jan. 30, 2015.

(51) Int. Cl.
*E04B 9/00* (2006.01)
*B64D 11/02* (2006.01)
*B64C 1/06* (2006.01)

(52) U.S. Cl.
CPC .............. *E04B 9/006* (2013.01); *B64C 1/066* (2013.01); *B64D 11/02* (2013.01); *E04B 9/003* (2013.01)

(58) Field of Classification Search
CPC ......... B64C 1/066; B64C 11/02; E04B 9/003; E04B 9/006
USPC ........................................................... 52/39
See application file for complete search history.

(56) References Cited

U.S. PATENT DOCUMENTS

| | | | |
|---|---|---|---|
| 2,844,428 | A | 7/1958 | Puntenney |
| 3,130,949 | A | 4/1964 | Wolff |
| 3,473,280 | A | 10/1969 | Stahlhut |
| 3,697,743 | A | 10/1972 | Eargle |
| 4,791,539 | A | 12/1988 | Ewing |
| 5,092,493 | A | 3/1992 | Pehr |
| 5,226,719 | A | 7/1993 | Feldpausch |
| 5,309,342 | A | 5/1994 | Heinen, Sr. |
| 5,478,032 | A | 12/1995 | Miller |
| 5,482,232 | A | 1/1996 | Wynn |
| 5,502,930 | A | 4/1996 | Burkette et al. |
| 5,522,638 | A | 6/1996 | Falcoff |

(Continued)

OTHER PUBLICATIONS

PCT/US2016/015780 Search Report & Written Opinion dated Mar. 29, 2016.
CN2015800166226 Office Action received Mar. 7, 2018.

*Primary Examiner* — Charles A Fox
*Assistant Examiner* — James J Buckle, Jr.
(74) *Attorney, Agent, or Firm* — Jeffer Mangels; Butler & Mitchell LLP; Brennan C. Swain, Esq.

(57) ABSTRACT

A module for mounting within a ceiling panel assembly. The module includes an upper mounting frame that includes a main body portion that defines a central opening, a lower mounting frame that is at least partially received in the central opening of the upper mounting frame, and a latch assembly. The main body portion of the upper mounting frame includes a flange extending outwardly therefrom. The lower mounting frame is pivotable with respect to the upper mounting frame between a first position and a second position. The latch assembly is associated with a first end of the upper mounting frame and the lower mounting frame. When the latch assembly is released the lower mounting frame pivots from the first position to the second position.

6 Claims, 11 Drawing Sheets

(56) References Cited

U.S. PATENT DOCUMENTS

| | | | |
|---|---|---|---|
| 5,609,414 | A | 3/1997 | Caluori |
| 5,997,158 | A | 12/1999 | Fischer |
| RE36,908 | E | 10/2000 | Ling |
| 6,264,348 | B1 | 7/2001 | Ellis |
| 6,578,233 | B1 | 6/2003 | Avila |
| 6,619,716 | B1 | 9/2003 | Sturt |
| 6,931,794 | B1 | 8/2005 | Burgess et al. |
| 7,520,686 | B2 | 4/2009 | Droege |
| 7,524,078 | B1 | 4/2009 | Pressel |
| 7,611,257 | B2 | 11/2009 | Engel |
| 7,795,533 | B2 | 9/2010 | Bravo |
| 7,798,348 | B2 | 9/2010 | Sawyer |
| 7,883,057 | B2 | 2/2011 | Lewis |
| 8,393,785 | B2 | 3/2013 | Sugishita |
| 8,733,990 | B2 | 5/2014 | Smith |
| 8,950,908 | B2 | 2/2015 | Berman |
| 9,170,014 | B2 | 10/2015 | Jersoviczki |
| 9,365,291 | B2 | 6/2016 | Savian |
| 9,551,482 | B2 | 1/2017 | Seward |
| 9,671,095 | B1 | 6/2017 | Sorensen |
| 2006/0109865 | A1 | 5/2006 | Rupert |
| 2009/0156037 | A1 | 6/2009 | Zayas |
| 2014/0071899 | A2 | 3/2014 | Plomteux |
| 2014/0299711 | A1 | 10/2014 | Ivester et al. |
| 2014/0357177 | A1 | 12/2014 | Stewart, Jr. |
| 2015/0029736 | A1 | 1/2015 | Aruga et al. |
| 2015/0166180 | A1 | 6/2015 | Schliwa |

CEILING PANEL ASSEMBLY AND MOUNTING SYSTEM THEREFOR

CROSS REFERENCE TO RELATED APPLICATIONS

This application is a continuation of U.S. patent application Ser. No. 15/011,215, filed Jan. 29, 2016, which claims the benefit of U.S. Provisional Application No. 62/110,380, filed Jan. 30, 2015, the entireties of which are incorporated by reference herein.

FIELD OF THE INVENTION

The present invention relates generally to a ceiling module, and more particularly to a ceiling module for use with a lavatory in an aircraft.

BACKGROUND OF THE INVENTION

Commercial aircraft, such as the Airbus A320 or Boeing 737, are typically constructed from modular components, the size, weight and construction of which are dictated by many considerations, including fuselage dimensions, aesthetic and safety. Many of these requirements are imposed by law or regulation. Aircraft components, such as overhead stowage compartments, seats, lavatories, galleys, lighting systems, etc. are all required to function within strictly confined spaces.

Manufacturers of aircraft are constantly refining interior aircraft designs to achieve more comfort and utility for passengers and crew within carrier-imposed restraints on cost, weight, maintenance down-time, and safety. Commercial passenger aircraft generally include lavatories for use by passengers and crew that include a ceiling that may have components such as a light, smoke detector and or speaker therein. Typically, each of the components is individually mounted in its own unique way in the ceiling panel. They each require a different set of hardware, different set of fasteners and inserts. Therefore, the look, is not uniform.

SUMMARY OF THE PREFERRED EMBODIMENTS

In accordance with a first aspect of the present invention there is provided a module for mounting within a ceiling panel assembly. The module includes an upper mounting frame that includes a main body portion that defines a central opening, a lower mounting frame that is at least partially received in the central opening of the upper mounting frame, and a latch assembly. The main body portion of the upper mounting frame includes a flange extending outwardly therefrom. The lower mounting frame is pivotable with respect to the upper mounting frame between a first position and a second position. The latch assembly is associated with a first end of the upper mounting frame and the lower mounting frame. When the latch assembly is released the lower mounting frame pivots from the first position to the second position. In a preferred embodiment, one of the upper mounting frame and lower mounting frame includes two pivot pins extending inwardly therefrom and the other of the upper mounting frame and the lower mounting frame includes two pivot openings defined therein. The pivot pins are received in the pivot openings. Preferably, the pivot openings comprise a pivot slot that is open to an outside of the upper mounting frame or the lower mounting frame. In a preferred embodiment, the pivot pins extend inwardly from the main body portion of the upper mounting frame into the central opening and the pivot openings are defined in the lower mounting frame.

In a preferred embodiment, the latch assembly includes a latch member that is mounted on one of the lower mounting frame or the upper mounting frame and a ledge that is disposed on the other of the lower mounting frame or the upper mounting frame. Preferably, the latch member is mounted within a protrusion on the upper mounting frame. The protrusion defines a latch pocket in which an engagement surface on the latch member is positioned. The engagement surface is accessible via an opening defined in the protrusion. Preferably, a stationary portion of the latch member is received in a receiver opening that is separated from the latch pocket by a divider.

In a preferred embodiment, the module also includes a bezel that includes tabs extending upwardly therefrom. The tabs are received in channels defined in the upper mounting frame. Preferably, the first end of the lower mounting frame includes alignment tabs extending therefrom that are received in alignment openings defined in the upper mounting frame and the upper mounting frame includes at least one electrical connection cylinder extending upwardly from an upper surface thereof. In another preferred embodiment, the upper mounting frame and lower mounting frame include complementary curved hinge members disposed on the second ends thereof.

In a preferred embodiment, the module includes a component that is mounted in the lower mounting frame. The component is at least one of an oxygen mask, a speaker, a smoke detector, an air extractor or a light and the component is pivotable together with the lower mounting frame between the first position and the second position.

In accordance with another aspect of the present invention there is provided a module for mounting within a ceiling panel assembly that includes an upper mounting frame and a lower mounting frame. The upper mounting frame includes a main body portion that defines a central opening. The main body portion includes a flange extending outwardly therefrom and the upper mounting frame includes a first end and a second end. Two pivot pins extending inwardly from the main body portion into the central opening and a latch member is mounted within a protrusion on the first end of the upper mounting frame. The lower mounting frame is at least partially received in the central opening of the upper mounting frame and includes a first end and a second end. The first end includes a ledge that is engaged with the latch member of the upper mounting frame. The lower mounting frame includes two pivot openings defined therein that are communicated with pivot slots that are open to an outside of the lower mounting frame, and the pivot pins are received in the pivot openings. The lower mounting frame is pivotable with respect to the upper mounting frame between a first position and a second position.

In accordance with another aspect of the present invention there is provided a lower mounting frame for use with a mounting system that includes an upper mounting frame. The lower mounting frame includes a main body portion that includes first, second, third and fourth sides, a bottom surface and a top edge, a ledge that is positioned on the first side of the main body portion, and first and second pivot slots defined in the third and fourth sides of the main body portion. The first and second pivot slots each have a first portion that extends generally parallel to the bottom surface of the main body portion and a second portion that angles upwardly from the first portion and is open to the top edge of the main body portion. Preferably, the lower mounting frame includes alignment tabs extending upwardly therefrom that are adapted to be received in alignment openings defined in the upper mounting frame. In a preferred embodiment, the bottom surface of the main body portion includes at least one of an opening for receiving a grill, a speaker grill or a light cover.

The present invention provides a generally uniform system that allows the mounting of different components of different sizes. For example, in the commercial aircraft industry there are a number of different speakers that are typically used. The present invention allows all of these speakers to be mounted, where before there were three different mounting styles for each speaker.

In the present invention, each of the components can be removed individually. Each component has its own pivot and latching system, which is beneficial for maintenance. It also allows for different looks. A bezel can be used if desired.

BRIEF DESCRIPTION OF THE DRAWINGS

Like numerals refer to like parts throughout the several views of the drawings.

DETAILED DESCRIPTION OF THE PREFERRED EMBODIMENTS

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

FIGS. 1-10 show a ceiling module or ceiling panel assembly 10 in accordance with a preferred embodiment of the present invention. In an exemplary embodiment, the ceiling module can be used in a modular aircraft lavatory, such as the one taught in U.S. Patent Publication No. 2014/0196206, published on Jul. 17, 2014, the entirety of which is incorporated by reference herein in its entirety. However, this is not a limitation and the ceiling module can be used elsewhere.

Figure 1:
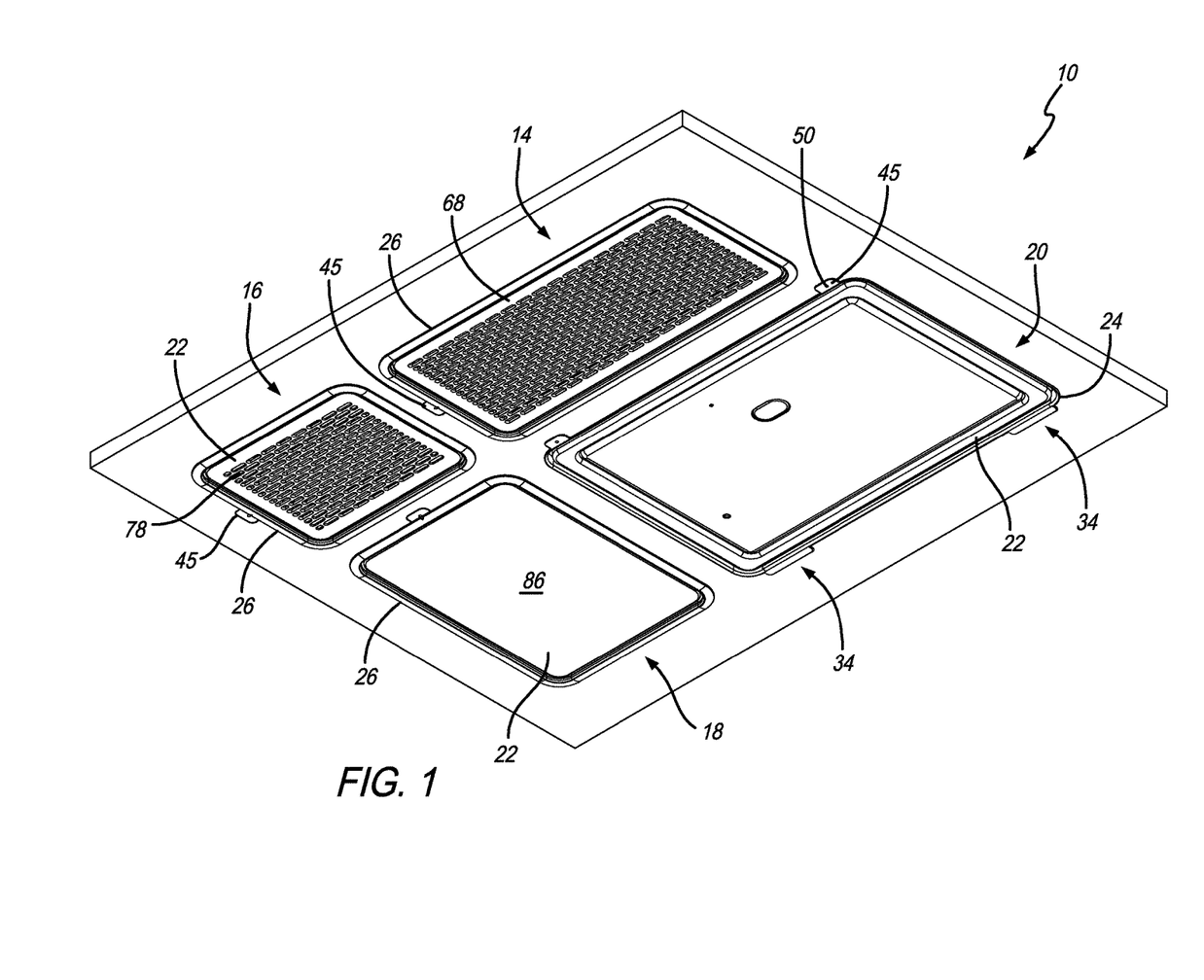
FIG. 1 is a front perspective view of ceiling module in accordance with a preferred embodiment of the present invention.
Figure 2:
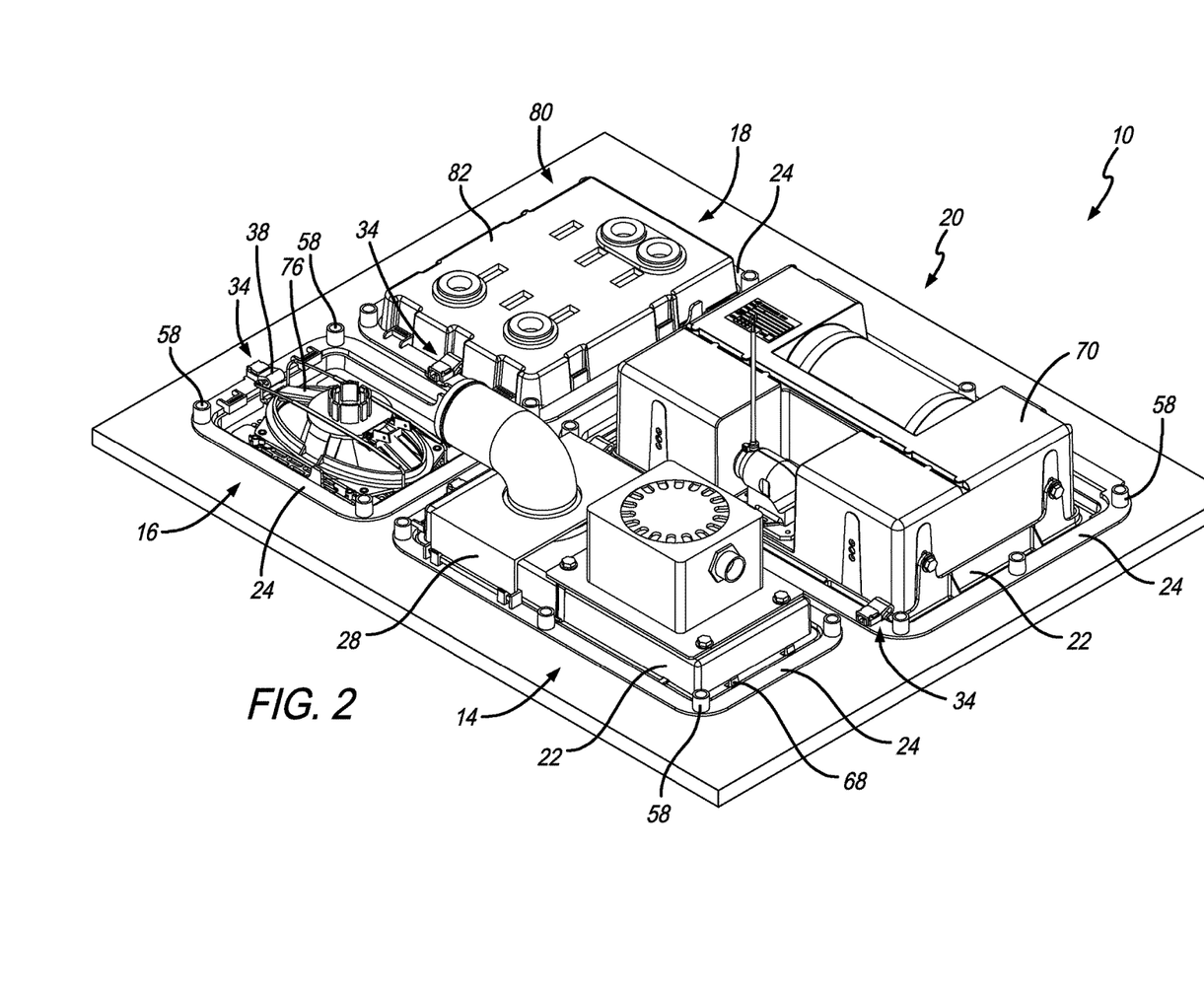
FIG. 2 is a rear perspective view of the ceiling module of FIG. 1.

As shown in FIGS. 1-2, in a preferred embodiment, the ceiling panel assembly 10 generally includes a panel 12 and a plurality of modular components that each include a similar mounting system for mounting the component in the panel 12. It will be appreciated that the number and types of components are not limiting on the present invention. However, for exemplary purposes only, the drawings show an air extractor module 14, a speaker module 16, a light module 18 and an oxygen module 20. The system can be used to mount other components, such as smoke detectors, personal service units, flight attendant call and other buttons, etc.

Figure 3:
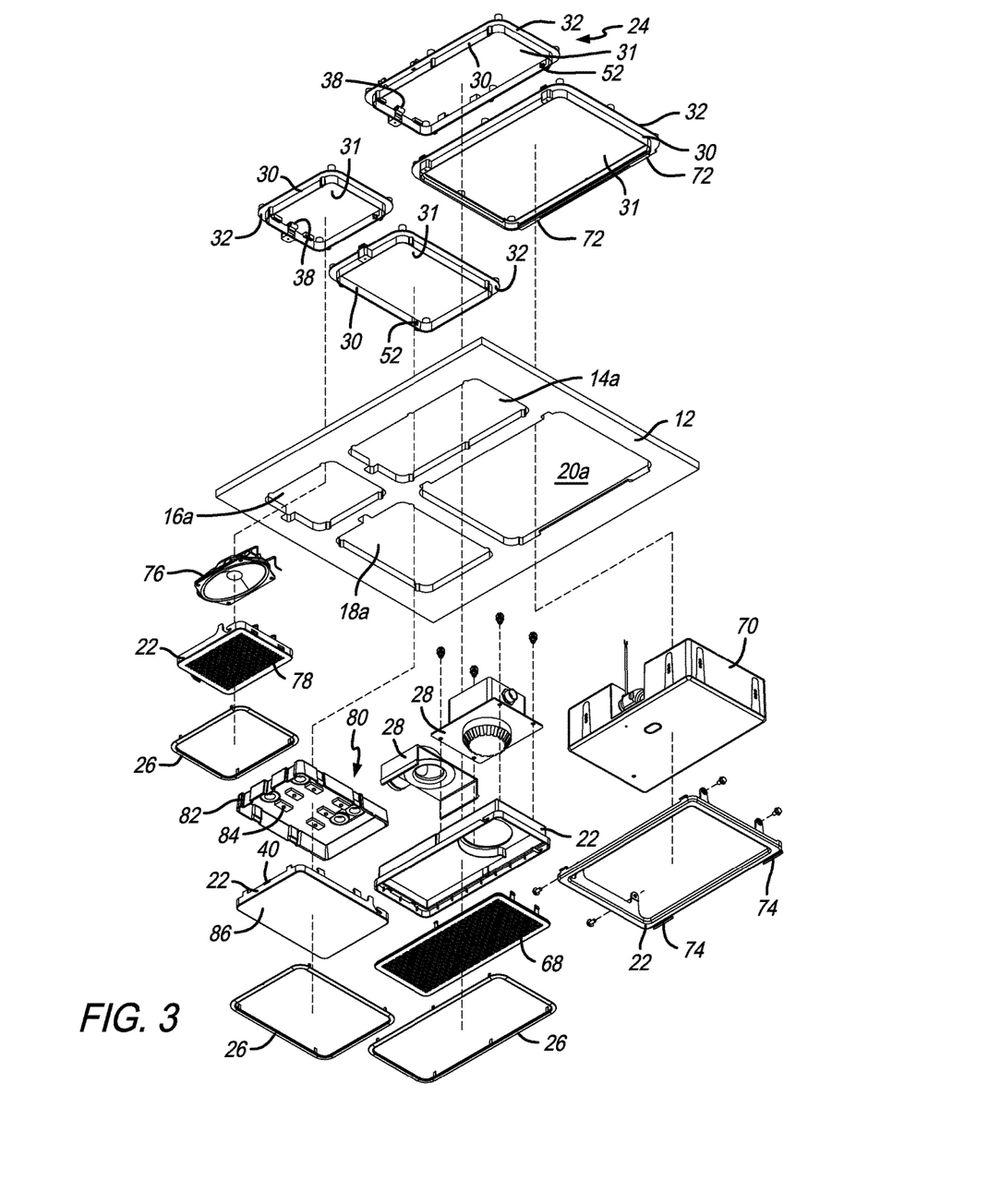
FIG. 3 is a front exploded perspective view of the ceiling module of FIG. 1.
Figure 4:
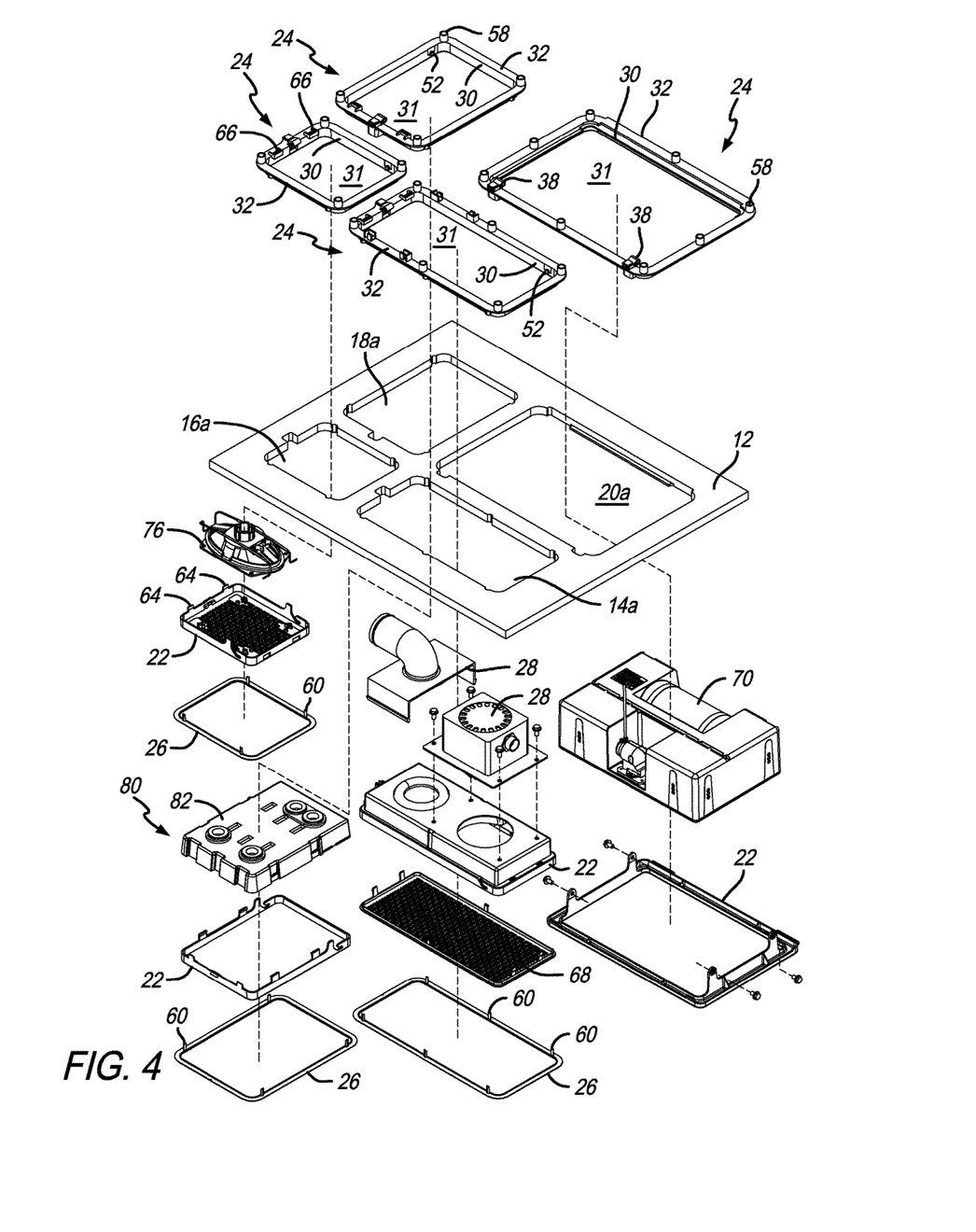
FIG. 4 is a rear exploded perspective view of the ceiling module of FIG. 1.

As shown in FIGS. 3-4, each module includes a lower mounting frame 22 and an upper mounting frame 24. The lower and upper mounting frames 22 and 24 for each component are sized and shaped differently, but each of the lower and upper mounting frames 22 and 24 work together to provide a system to mount the component within the panel 12. In a preferred embodiment, one or more of the modules also includes a bezel 26 that mates with and mounts on the upper mounting frame 24 (or the lower mounting frame 22). The bezel 26 can be included or excluded depending on the desired look of the ceiling panel assembly 10. To receive the individual modules, the panel 12 includes an air extractor module opening 14a, a speaker module opening 16a, a light module opening 18a and an oxygen module opening 20a. The openings also include cutouts for any protrusions on the upper mounting frame 24.

As shown in FIGS. 3-9, the upper mounting frames 24 each include a main body portion 30 that is sized to be received in the opening in the panel 12 and includes a central opening 31 and a flange 32 that extends outwardly therefrom. The flange 32 includes a bottom surface 32a that rests against the top surface of the ceiling panel 12 and is typically bonded thereto. The individual components (air extractor, light, speaker, etc.) are mounted or connected to the lower mounting frame 22. As will described below, the lower mounting frame 22 for each component may be different. However, each of the lower mounting frames 22 have similar features that allow the lower mounting frames 22 to hingedly connect and be latched to the upper mounting frames 24. The lower mounting frame 22 is sized to be at least partially received in the central opening 31 (i.e., it has a smaller width and length dimension than the upper mounting frame 24).

The lower and upper mounting frames 22 and 24 include a first end that includes a latch assembly 34 and a second end that includes a pivot or hinge assembly 36. Any type of latch assembly that allows the lower mounting frame 22 to latch to the upper mounting frame 24 is within the scope of the present invention. Furthermore, any type of pivot assembly that allows the lower mounting frame 22 (and the component therein) to pivot with respect to the upper mounting frame 24 between a first position (where it is latched in place and operational) and a second position (where it is hinged downwardly for maintenance or removal) is within the scope of the present invention.

Figure 5A:
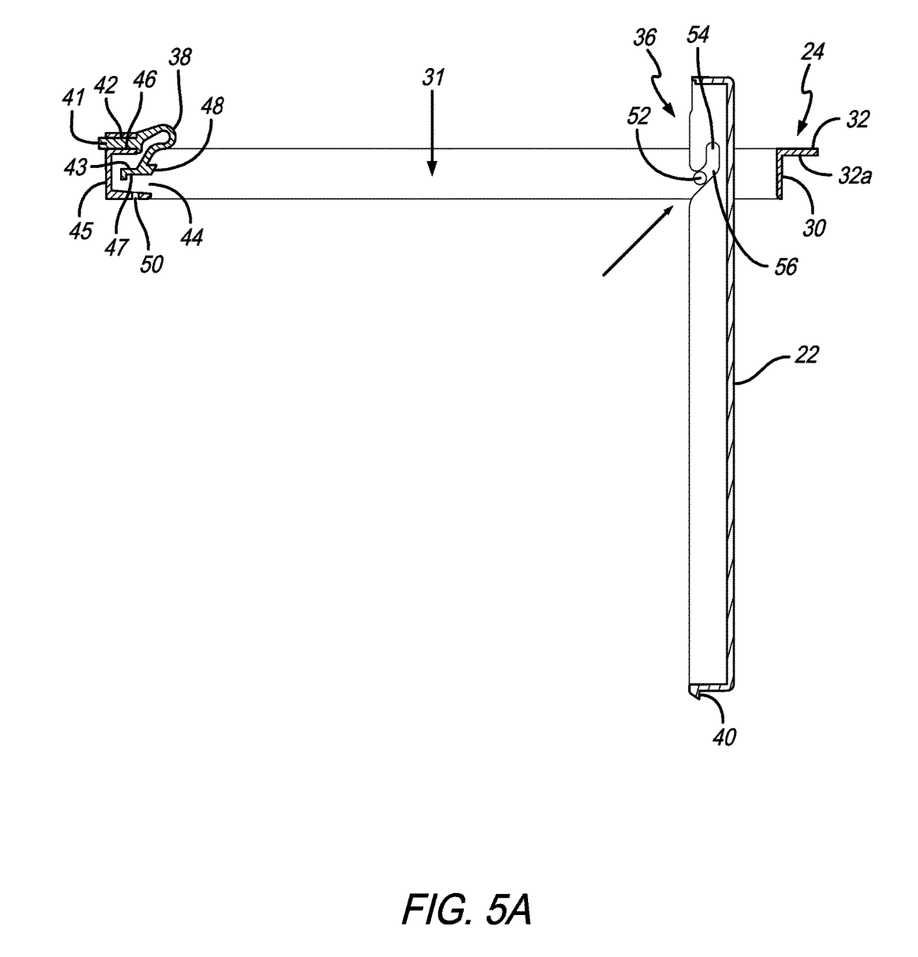
FIG. 5A is a cross-sectional side elevational view showing the lower mounting frame being connected to the upper mounting frame.
Figure 5B:
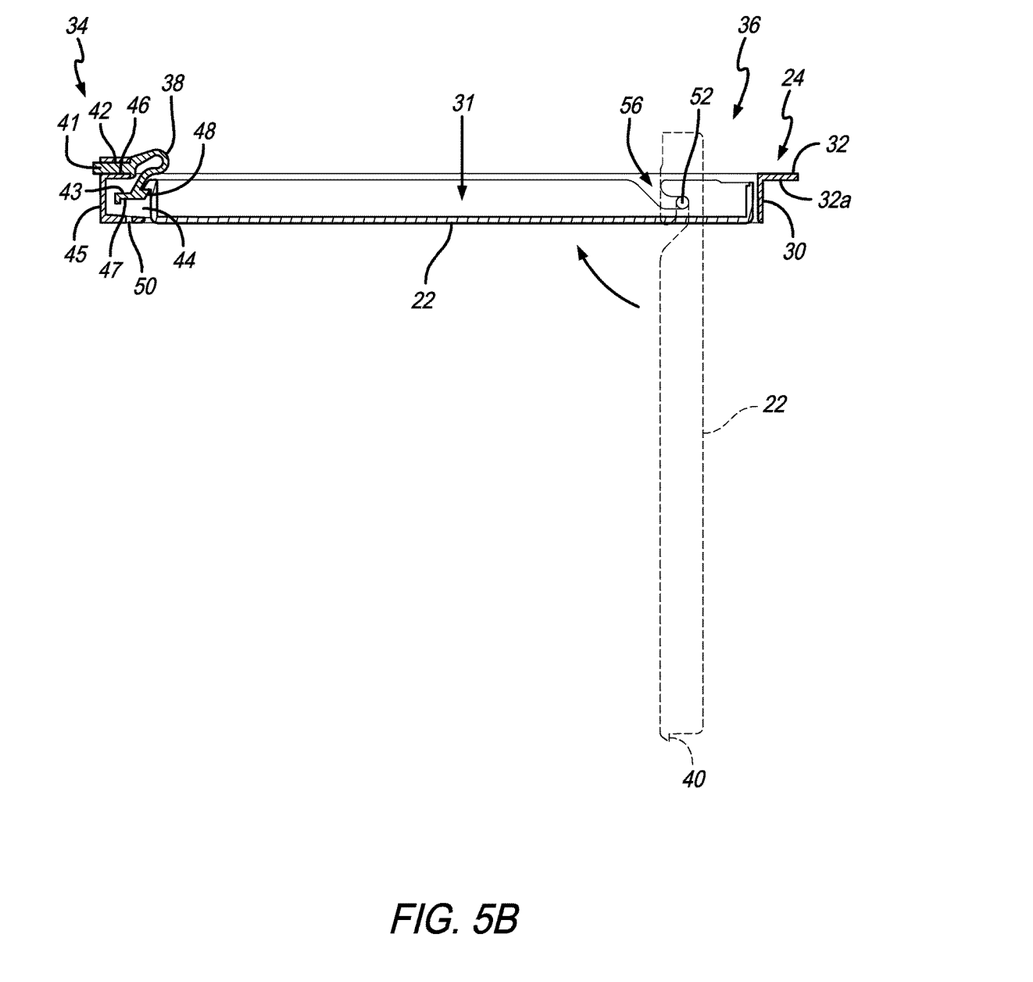
FIG. 5B is a cross-sectional side elevational view showing the lower mounting frame pivoting from the second position (the maintenance position) to the first position (the operation position)

As shown in FIGS. 5A-5B, in a preferred embodiment, the latch assembly 34 includes a pivotable latch member 38 on the upper mounting frame 24 and a ledge 40 that is captured by the latch member 38 on the lower mounting frame 22. The latch member 38 includes a stationary portion 41 that is received in a receiver opening 42 and a latch portion 43 that is received in a latch pocket 44. The latch pocket 44 and receiver opening 42 are open to the inner surface of the main body portion 30 of the upper mounting frame 24 and are defined in a protrusion 45 that extends from the main body portion 30. The latch pocket 44 and receiver opening 42 are separated by a divider 46. This arrangement holds the stationary portion 41 within receiver opening 42 and allows the latch portion 43 to flex or pivot within latch pocket 44. The latch portion 43 includes a beak 48 that mates with or captures the ledge 40 on the lower mounting frame 22 in the first position. The latch portion 43 also includes an engagement surface 47. To release the lower mounting frame 22 a small object such as the tip of a pen or a paper clip is inserted into a release opening 50 that is defined in the protrusion 45 and/or main body portion 30 and communicated with the latch pocket 44. Once the object is inserted through the release opening 50 it contacts the engagement surface 47 and pivots the beak 48 so that it disengages from the ledge 40. Gravity then causes the lower mounting frame 22 to pivot downwardly, as is shown in FIG. 5B in hidden lines. In another embodiment, the latch member 38 can be on the lower mounting frame 22 and the ledge 40 can be on the upper mounting frame 24.

In a preferred embodiment, the hinge assembly 36 includes opposing pivot pins 52 located on the second end of the upper mounting frame 24 and complementary pivot openings 54 and slots 56 defined in the second end of the lower mounting frame 22. Preferably, the pivot pins 52 protrude inwardly into central opening 31. However, the pivot pins 52 can also protrude or extend outwardly. As shown in FIG. 5A, to connect the lower mounting frame 22 to the upper mounting frame 24, the open end of the slots 56 are positioned over the pivot pins 52 and the lower mounting frame 22 is then moved downwardly into place so that the pivot pins 52 move all the way to the closed end of the slots 56 (referred to herein as the pivot openings 54). In a preferred embodiment, the slots 56 include a portion that is parallel to the upper and lower surfaces of the lower mounting frame 22 and a portion that is angled relative thereto. In another embodiment, the slots 56 can be omitted and only closed pivot openings 54 can be used. As shown in FIG. 5B, the lower mounting frame is then pivoted upwardly from the second position (shown in hidden lines) to the first position (shown in solid lines) where the ledge 40 engages the beak 48 of the latch member 38. When moving to the first position, an inclined edge on the ledge 40 pushes against an inclined edge on the beak 48 to pivot the beak 48 out of the way so the beak 48 and ledge 40 can engage one another.

As shown in FIGS. 5-9, in a preferred embodiment, the lower mounting frames 22 include a main body portion 88 that includes first 88a, second 88b, third 88c and fourth sides 88d, a bottom surface 88e and a top edge 88f. As shown, the ledge 40 is preferably positioned on the first side 88a and the pivot slots 56 (and pivot openings 54) are defined in the third 88c and fourth sides 88d of the main body portion 88. The first portion of the pivot slots 56 extends generally parallel to the bottom surface 88e of the main body portion 88 and the second portion of the pivot slots 56 extends or angles upwardly from the first portion and is open to the top edge 88f of the main body portion 88.

As shown in FIGS. 3-9, in a preferred embodiment, the upper mounting frames 24 include a plurality of electrical connection cylinders 58 thereon. The cylinders 58 are provisions for wiring. A preexisting zip-tie mount for wires clips into the cylinders 58. They basically receive a small loop with a built-in zip-tie that has a Christmas tree shaped wire harness on the end of it that clicks/fits into that cylinder. This allows wiring to be run between the individual components. In a preferred embodiment, the bezels 26 include tabs 60 extending therefrom that are received in channels 62 defined in the upper mounting frames 24. In a preferred embodiment, the lower mounting frames 22 also include alignment tabs 64 extending upwardly therefrom that are received in alignment openings 66 in the upper mounting frame. This helps align the lower mounting frame 22 with the upper mounting frame 24 so that the latch member 38 properly aligns with the ledge 40.

Figure 6:
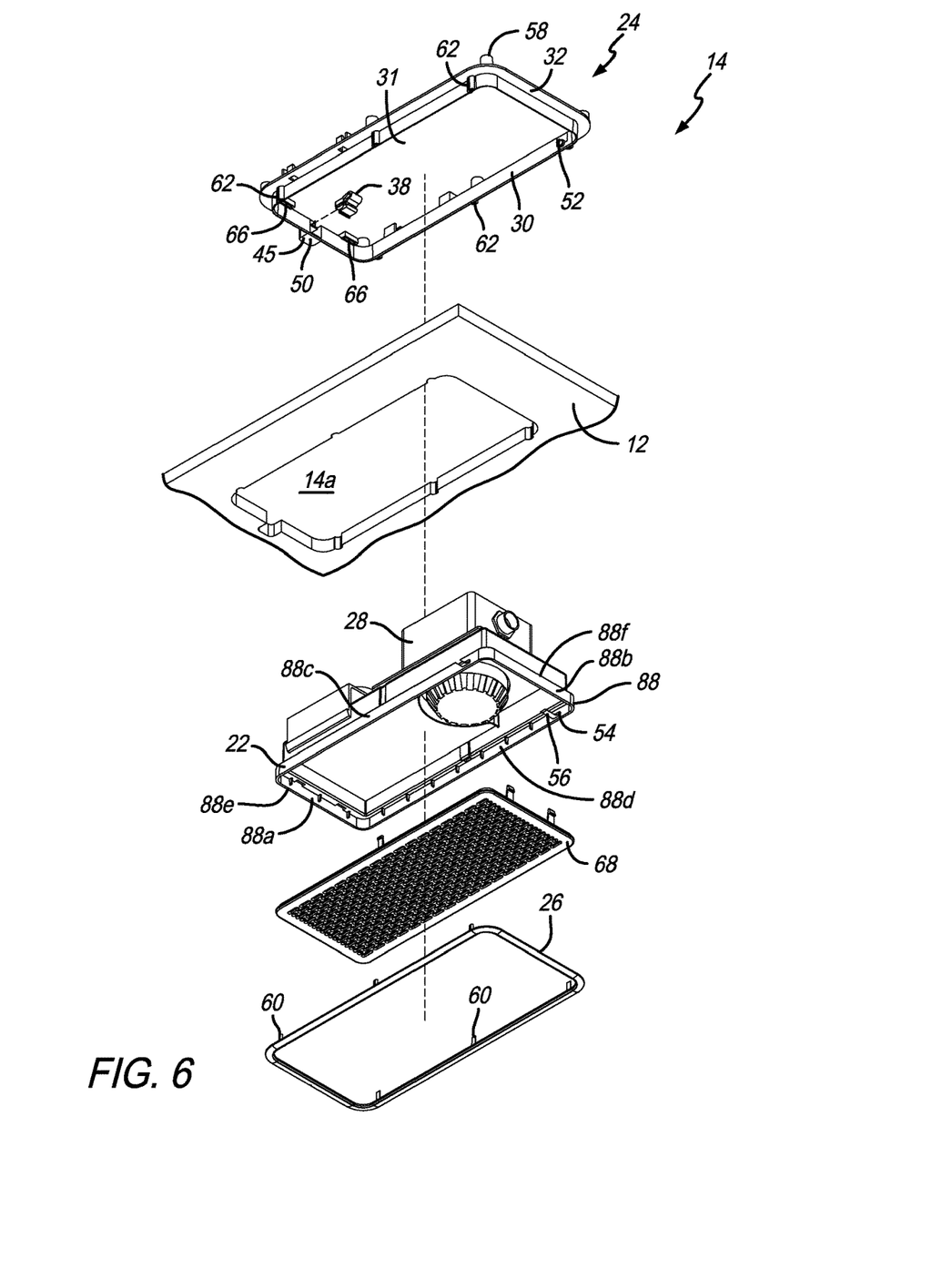
FIG. 6 is an exploded view of the air extractor module.

With reference to FIG. 6, the air extractor module 14 includes the lower mounting frame 22, the upper mounting frame 24, the bezel 26 and the air extractor assembly 28. The air extractor assembly 28 is mounted within the lower mounting frame 22 and includes a grill 68 that snap fits onto the lower mounting frame 22. The lower mounting frame 22 includes the slots 56 and pivot openings 54 defined therein, as well as ledge 40.

Figure 7:
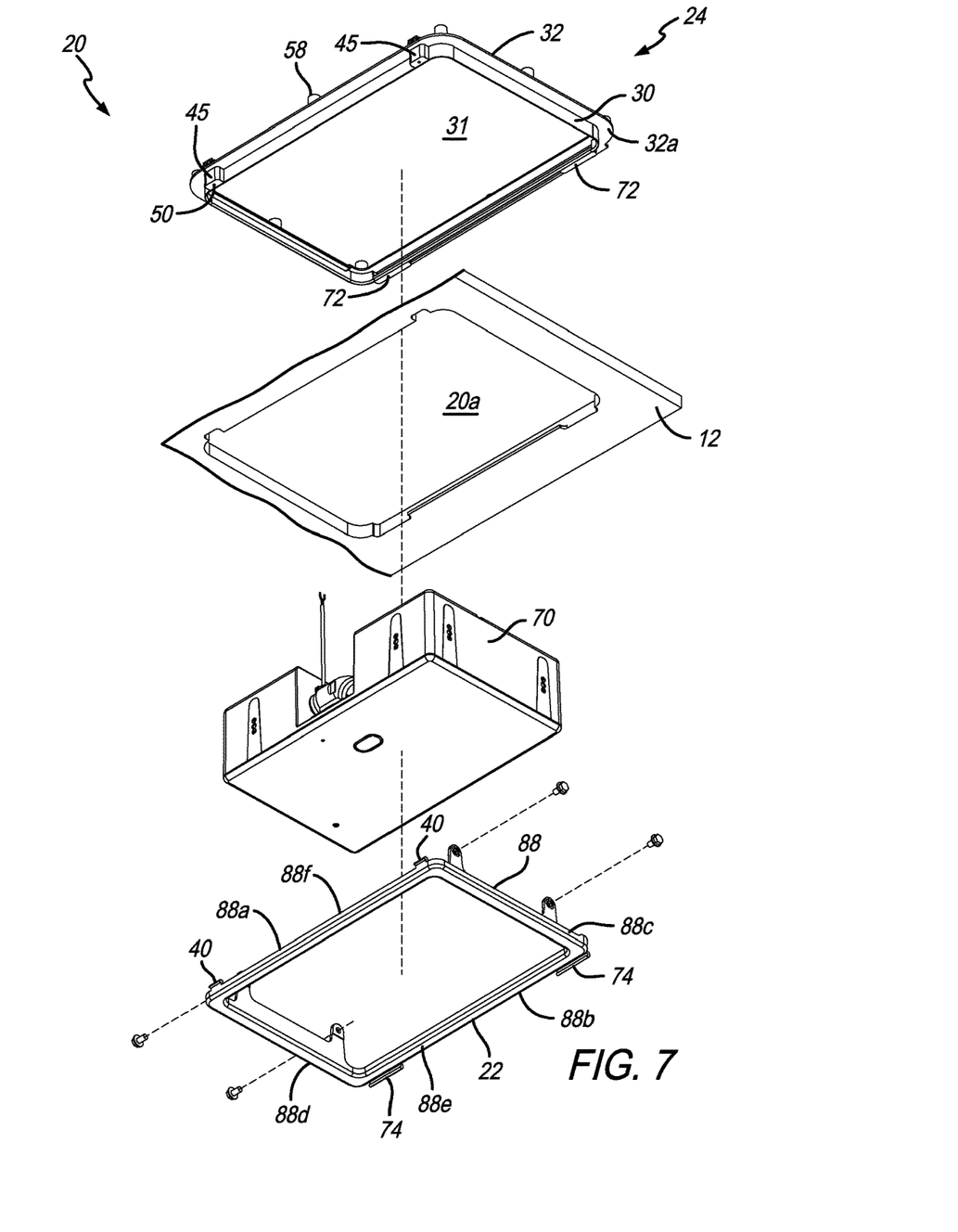
FIG. 7 is an exploded view of the oxygen module.

With reference to FIG. 7, the oxygen module 20 includes the upper mounting frame 24, the lower mounting frame 22 and the oxygen box 70 (which includes components such as the oxygen mask). The lower mounting frame 22 of the oxygen module 20 includes two ledges 40 for mating with two latch members 38 on the upper mounting frame 24. The hinge assembly 36 is different than the hinge assembly 36 on the other three components. The hinge assembly 36 includes complementary upper and lower curved hinge members 72 and 74 that engage one another and allow the lower mounting frame 22 and oxygen box 70 to pivot with respect to the upper mounting frame 24. As shown, the oxygen box 70 is attached to the lower mounting frame 22 by threaded fasteners.

Figure 8:
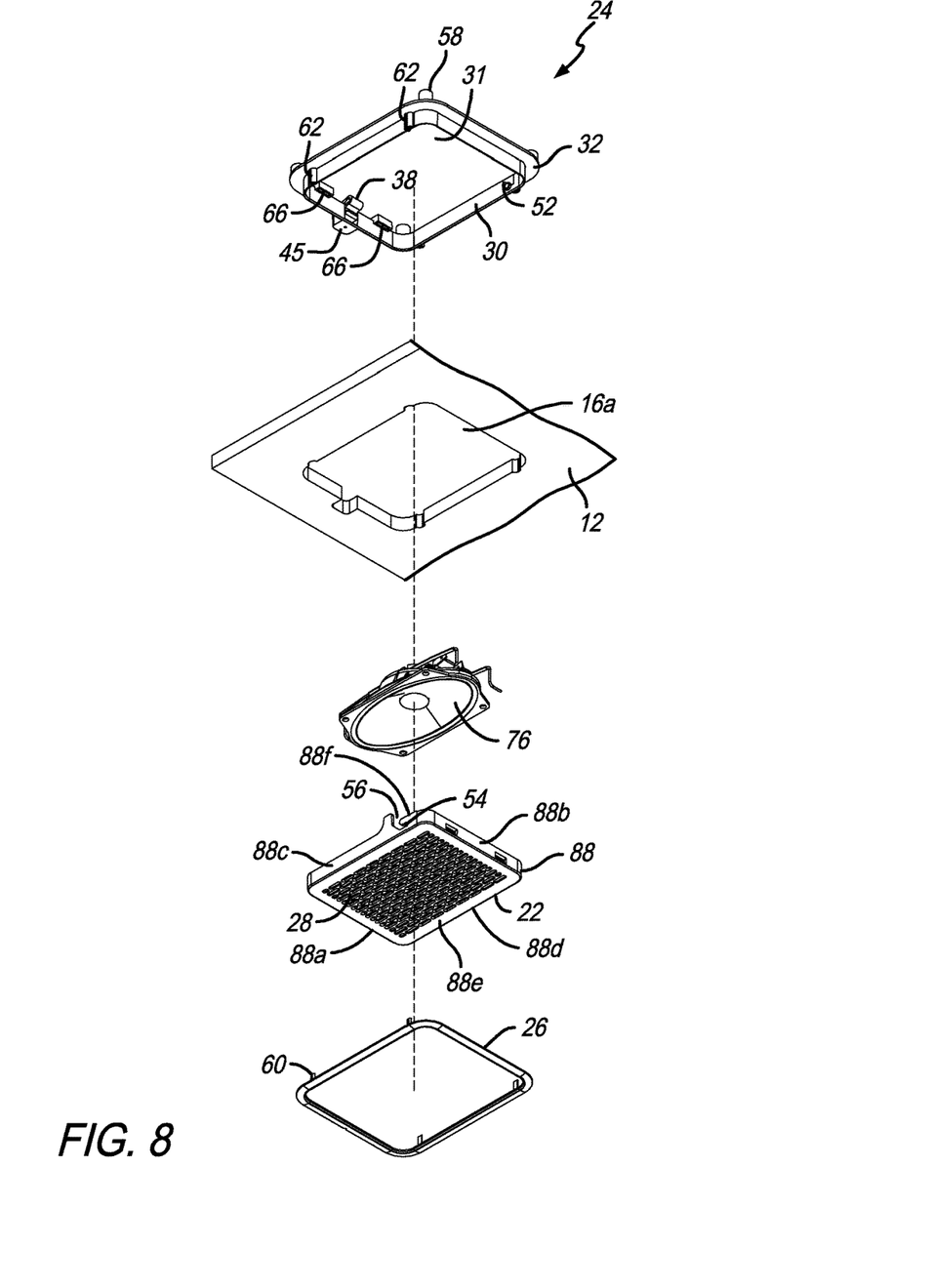
FIG. 8 is an exploded view of the speaker module.

With reference to FIG. 8, the speaker module 16 includes the lower mounting frame 22, the upper mounting frame 24, the bezel 26 and the speaker 76. The lower mounting frame 22 includes the slots 56 and pivot openings 54 defined therein as well as the speaker grill 78 and ledge 40.

Figure 9:
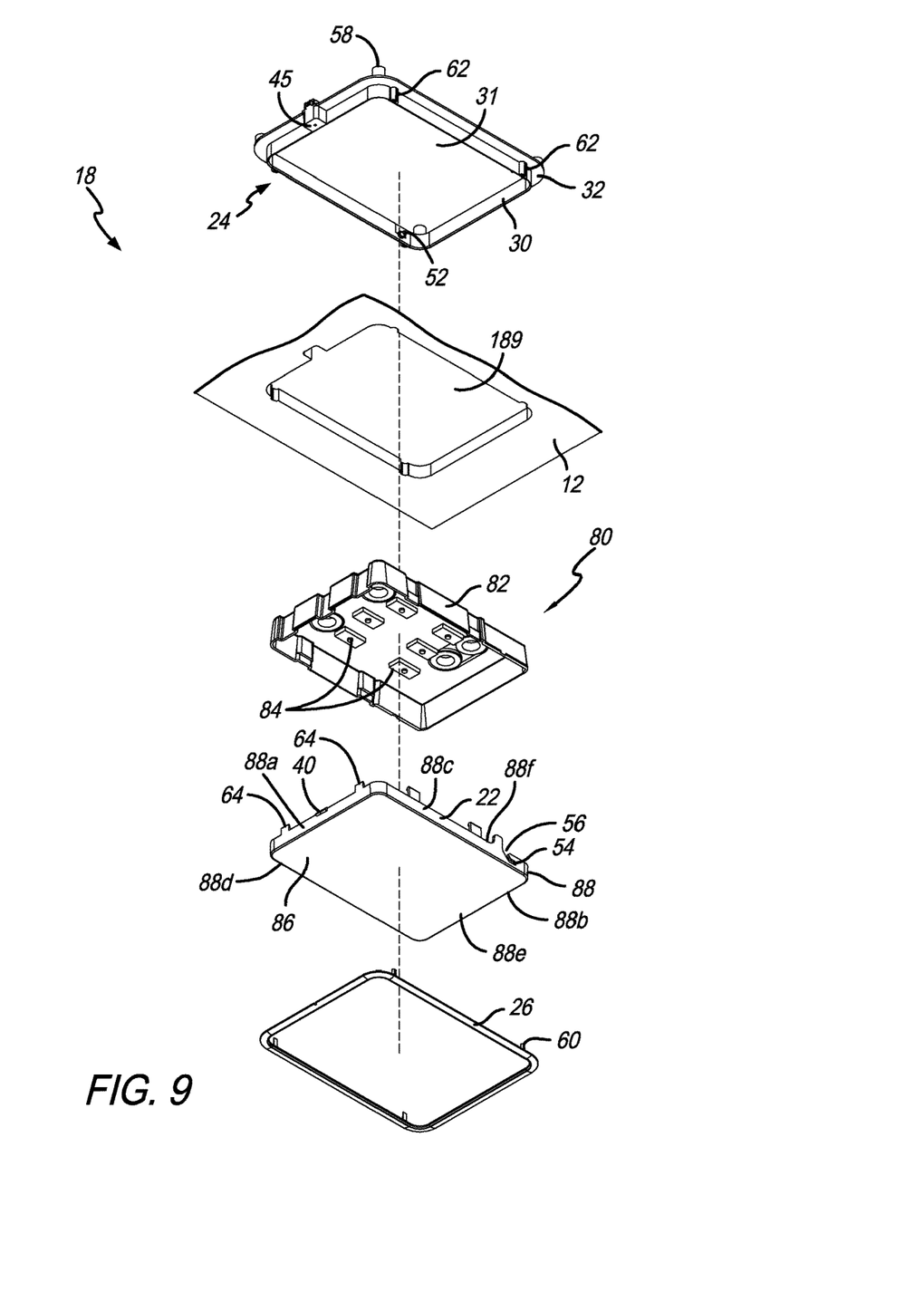
FIG. 9 is an exploded view of the light module.

With reference to FIG. 9, the light module 18 includes the lower mounting frame 22, the upper mounting frame 24, the bezel 26 and the light assembly 80, which includes a housing 82 and lights 84 (e.g., LEDs) therein. The lower mounting frame 22 includes the slots 56 and pivot openings 54 defined therein as well as the lens cover 86 and ledge 40.

Figure 10:
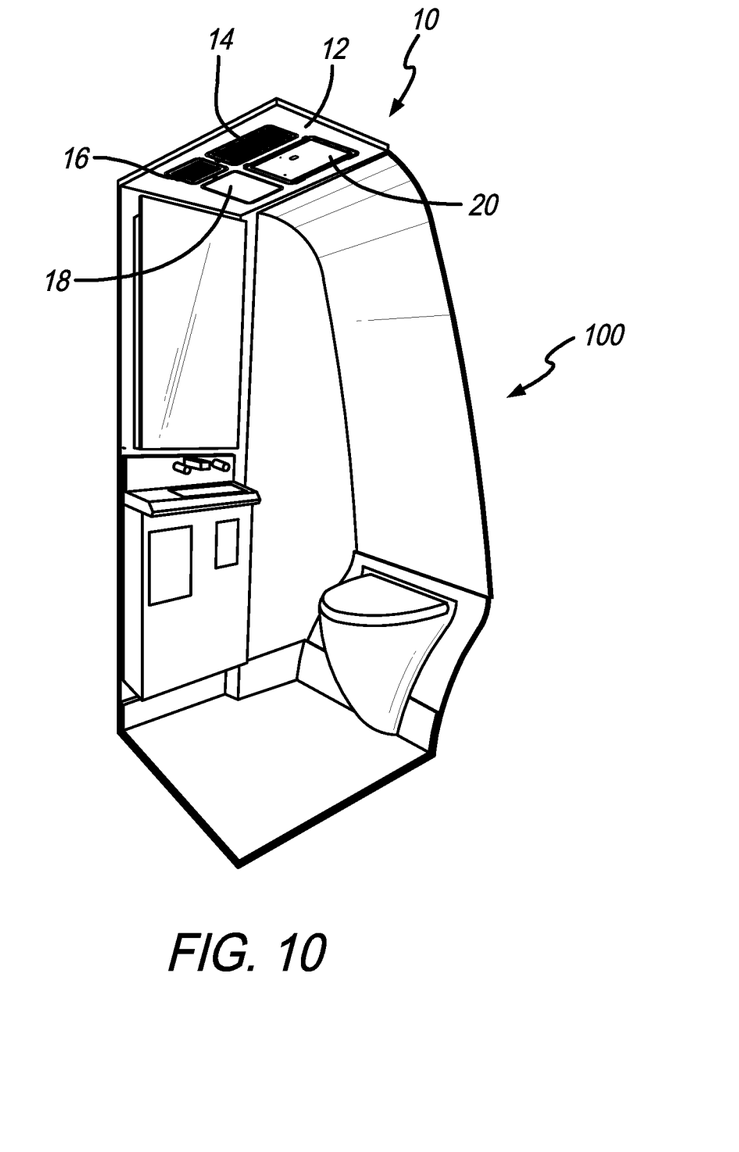
FIG. 10 is a perspective view showing the ceiling module of FIG. 1 used in an aircraft lavatory.

FIG. 10 shows the entire ceiling panel assembly 10 inserted into the shell of a lavatory 100.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A module for mounting within a ceiling panel assembly, the module comprising:
    an upper mounting frame that includes a main body portion that includes an inner surface that defines a central opening having a central opening axis, wherein the main body portion includes a flange extending outwardly therefrom, wherein the flange extends outwardly from and approximately perpendicular to the central opening axis such that when the module is mounted in a ceiling panel assembly a bottom surface of the flange is parallel to a top surface of the ceiling panel assembly, and wherein the upper mounting frame includes opposing first and second ends, and opposing first and second sides,
    a lower mounting frame that is at least partially received in the central opening of the upper mounting frame, wherein the lower mounting frame includes a first end and a second end, wherein the lower mounting frame is pivotable about a pivot point with respect to the upper mounting frame between a first position and a second position, wherein the pivot point is located closer to the second end than the first end,
    wherein one the upper mounting frame includes at least one upper curved hinge member extending therefrom, wherein the lower mounting frame includes at least one lower curved hinge member that is engaged with the upper curved hinge member, such that the lower mounting frame can pivot with respect to the upper mounting frame, and a latch assembly that is associated with the first end of the upper mounting frame and the lower mounting frame, wherein when the latch assembly is released the lower mounting frame pivots from the first position to the second position, wherein the latch assembly includes a latch member that is mounted within a protrusion on the upper mounting frame and a ledge that is disposed on the lower mounting frame, wherein the protrusion defines a latch pocket in which an engagement surface on the latch member is positioned, and wherein the engagement surface is accessible via an opening defined in the protrusion.

2. The module of claim 1 wherein a stationary portion of the latch member is received in a receiver opening, and wherein the receiver opening is separated from the latch pocket by a divider.

3. The module of claim 1 further comprising a bezel that includes tabs extending upwardly therefrom, wherein the tabs are received in channels defined in the upper mounting frame.

4. The module of claim 1 wherein the flange of the upper mounting frame includes at least one electrical connection cylinder extending upwardly from an upper surface thereof.

5. The module of claim 1 wherein a component is mounted in the lower mounting frame, wherein the component is at least one of an oxygen mask, a speaker, a smoke detector, an air extractor or a light, and wherein the component is pivotable together with the lower mounting frame between the first position and the second position.

6. The module of claim 1 further comprising a second latch assembly that is associated with the first end of the upper mounting frame and the lower mounting frame, wherein when both the latch assembly and the second latch assembly are released the lower mounting frame pivots from the first position to the second position, wherein the second latch assembly includes a second latch member that is mounted within a second protrusion on the upper mounting frame and a second ledge that is disposed on the lower mounting frame, wherein the second protrusion defines a second latch pocket in which a second engagement surface on the second latch member is positioned, and wherein the second engagement surface is accessible via a second opening defined in the second protrusion.

* * * * *